United States Patent Office 3,402,636
Patented Sept. 24, 1968

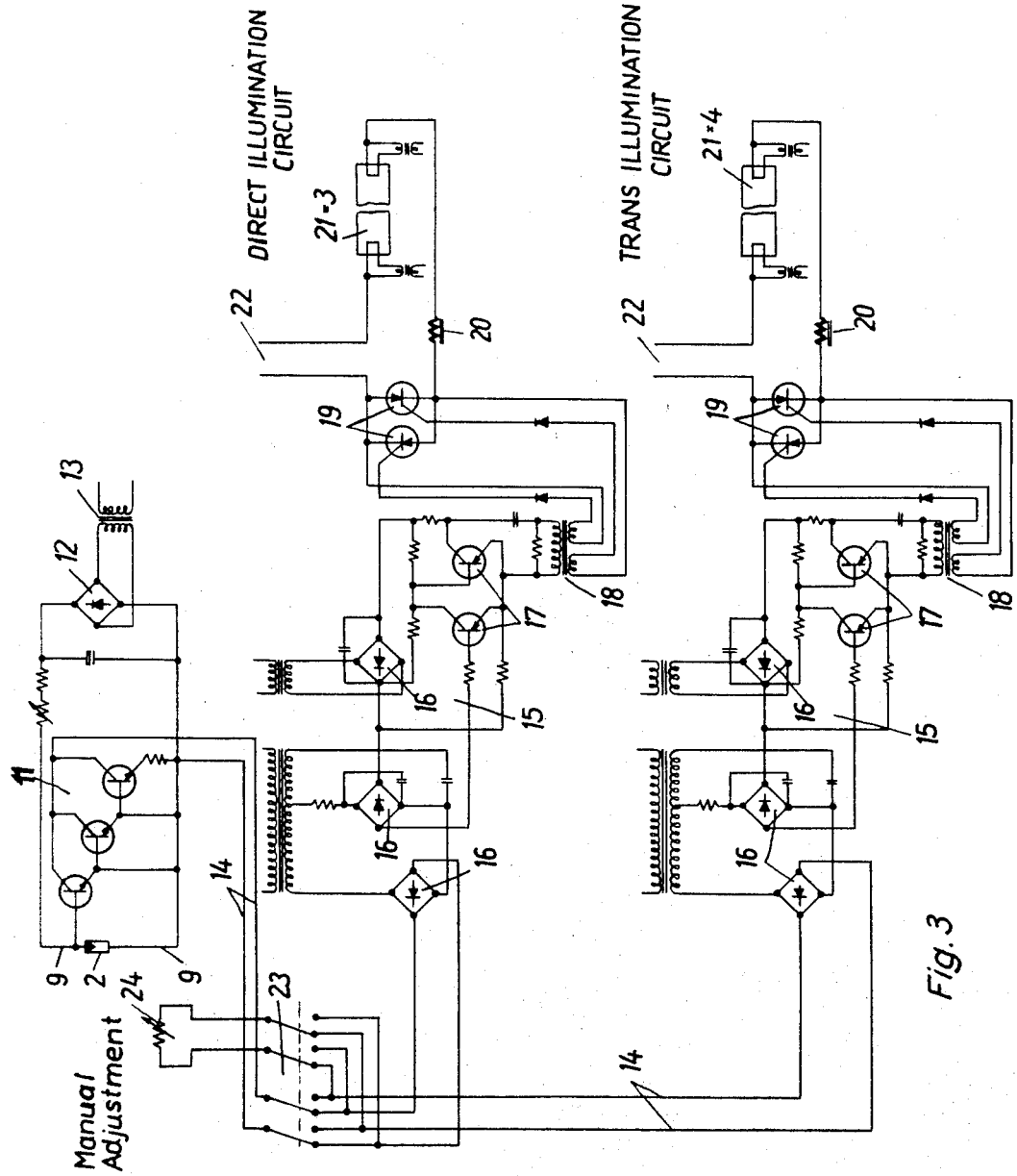

3,402,636
METHOD AND MEANS FOR AUTOMATICALLY ADJUSTING THE LIGHT PROJECTION IN MICROFILM CAMERAS
Richard Gemmer, Frankfurt am Main, and Walter Scheffel, Langenfeld, Germany, assignors, by mesne assignments, to Agfa-Gevaert Aktiengesellschaft, Leverkusen, Germany, a corporation of Germany
Filed June 3, 1965, Ser. No. 460,954
Claims priority, application Germany, June 3, 1964, J 25,954
10 Claims. (Cl. 88—24)

ABSTRACT OF THE DISCLOSURE

A photographic microfilm apparatus which illuminates directly and/or transilluminates the sheet to be photographed on microfilm by means of a plurality of green tinted fluorescent lamps. The light energy emanating from the illuminated sheet which is to be photographed impinges on a photoresistance, which by means of switching means and a phase-shift circuit adjusts the light energy emitted by the fluorescent lamps in inverse proportion to the amount of light energy reflected and partially directed into said photoresistance from the illuminated sheet that is to be photographed. The shutter mechanism of this arrangement has a fixed opening and a constant exposure time. The adjustment of the fluorescent lamps is such that substantially equal amounts of light energy, having substantially equal photochemical effects, enter the shutter opening, during each taking of a photographic picture, and impinge on the microfilm.

---

This invention relates generally to a photographic apparatus with automatic self-regulating illuminating means.

More specifically, this invention relates to a microfilm camera for taking microfilm photographs of blueprints, drawings, typewritten sheets, etc.

The microfilm camera of this invention includes illuminating means, such as, for example, fluorescent lamps, for transillumination and/or direct illumination.

The microfilm camera of this invention further includes means for stepwise advancing the microfilm in the camera. The microfilm camera is also provided with a photoelectric cell which regulates the light intensity of the illuminating means via electric regulating means such as, for example, a phase control circuit and potentiometer.

Photographic apparatuses which include means for automatically adjusting the illuminating means for correct exposure of the film are already known in the art. All of these known photographic apparatuses operate under the principle of (a) first measuring the light intensity, (b) then transmitting the result of the light measurement to the shutter mechanism of the camera and adjusting the exposure-time-opening of the latter. Thus, the result of the light intensity measurement determines the adjustment for the length of time the film is to be exposed or the size of the diaphragm opening, or sometimes a combination of both adjustments.

The transmission of the results of the light intensity measurements can take place in two ways, (a) by manually adjusting the shutter mechanism to correspond to the results of the light intensity measurement, (b) by automatic adjusting means which are operatively connected to the light intensity measuring means.

Both of the aforementioned arrangements are already known in the art. In the arrangement designated by (a), the light intensity is indicated by means of a potentiometer or the like, which is connected to a photo-electric cell or a photoresistance. The shutter opening and/or shutter time mechanism are then manually adjusted to correspond to the measurement indicated by the potentiometer. In the arrangement designated by (b), the shutter opening and/or shutter time mechanism are automatically adjusted to correspond to the reading of a potentiometer.

In the arrangement designated by (a), an electric measuring instrument is connected to a photo-electric cell or photoresistance and thusly indicates the light intensity. The shutter opening and/or shutter time mechanism are then adjusted. Such an adjustment can be effectuated by providing the measuring instrument with a first indicator hand. The shutter time mechanism and shutter opening are operatively connected to a second indicator hand coaxially mounted with said first indicator hand. The adjustment is accomplished by moving said second indicator hand over said first indicator hand. In this manner, a correct adjustment of the shutter mechanism is obtained.

In the automatic arrangement designated by (b), the light intensity measurement is transmitted from the photo-electric cell or photoresistance to the shutter mechanism which is then automatically adjusted by the former within a short time interval. In this manner, a correct automatic adjustment is obtained.

The operational basis for the aforedescribed arrangements lies in adjusting the shutter mechanism to conform to the lighting condition prevailing in the vicinity of the object to be reproduced. Since these lighting conditions, which may be artifically or naturally produced, usually vary considerably, the photographic apparatus requires adjustment of the shutter opening and/or shutter time mechanism in order to properly expose the light sensitive film.

Arrangements described above are generally not suited for microfilm photographic apparatuses because the latter must usually take a large number of pictures in quick succession. The aforedescribed adjustments, manual or automatic, are time-consuming and the installation is complex and may easily malfunction. What is best suited for a microfilm photographic apparatus is a shutter mechanism which operates without adjustments of either the shutter opening or the shutter time mechanism. The adjustment for the correct exposure of the microfilm is provided by regulating the amount of light emitted by the artificial illuminating means, such as, for example, fluorescent lamps, which illuminate the object to be reproduced. A simple embodiment of regulating means for adjusting the illuminating lamps comprises an adjustable electrical resistance in the energizing circuit of the lamps, which is adjusted in accordance with the prevailing light requirements. The light can in this manner be infinitely variably adjusted to provide the proper amount of illuminating light energy so that the correct amount of light is reflected by the object to be reproduced and impinges on a light sensitive film via the objective lens of the microfilm camera.

The illuminating light energy for the microfilm photographic apparatus is properly adjusted depending on the type of object that is to be photographically reproduced. Thus for instance, the illuminating light adjustment depends on whether a typewritten or printed sheet, or a drawing, are to be reproduced; also on the color of the paper and on the quality of the lines. The photographic microfilm of the camera should be exposed as uniformly as possible because the entire microfilm roll of the camera is developed under identical conditions and after development all pictures are reproduced on positive paper of the same density. In order to attain the aforedescribed objects, the illuminating lights must be adjusted in conformance with the type of object to be reproduced. It is already known to make the adjustable electrical resistance rotatable and to provide it with a scaled knob. The latter is mounted and connected to the adjustable rotatable resistance after calibrating the electrical adjustable resistance by taking a series of trial photographs. The aforedescribed known arrangement has the disadvantage of being inaccurate. This inaccuracy is increased by frequent fluctuations of the electrical supply voltage, which can, however, be disposed of by means of known technical voltage regulating means.

Another known arrangement, which renders somewhat better results, comprises a photo-electric cell or photoresistance by means of which the light reflection of the object to be reproduced is measured prior to turning on the illuminating lights. The photo-electric cell or photoresistance indicates by known electrical means the light reflection intensity of the object to be reproduced. The adjustable electrical resistance is then manually adjusted in accordance with the indicated and measured light reflection intensity.

In an alternate embodiment of the aforedescribed arrangement, the knob of the rotatable adjustable electrical resistance is not provided with a scale. The light intensity of the illuminating lamps is adjusted by lowering or increasing the electrical resistance until the light intensity reading of the electrical light measuring means indicates a certain reading which has been found, by prior trial and error, to be the correct one for a certain film speed of the microfilm.

Microfilm photographic apparatuses can generally be classified into three categories:

(1) Apparatuses wherein the object to be photographically reproduced can only be transilluminated;

(2) Apparatuses wherein the object to be photographically reproduced can only be directly illuminated thereby reflecting light; and (3) Apparatuses wherein the object to be photographically reproduced can be transilluminated or illuminated. The apparatuses of the last mentioned category can also operate by simultaneously directly illuminating and transilluminating the object to be reproduced. Such a form of illumination is advantageous in the reproduction of transparent drawings, particularly transparent drawings which include very thin pencil lines.

In the last mentioned category, the total light energy of both groups of light sources must be measured and must be adjusted to correspond to a particular film speed since the shutter opening and shutter exposure time are constant. The aforementioned total light energy can be measured by means of a photo-electric cell or photoresistance. The result of the measurement is used in setting the adjustable electrical resistance.

The illuminating of the photographic apparatus may consist of ordinary incandescent lamps or fluorescent lamps. An adjustable electrical resistance is best suited for regulating the illumination intensity of incandescent lamps. It is also known to employ a phase shift circuit for regulating the illumination intensity of fluorescent lamps. Such a phase shift circuit permits an infinitely variable regulation from the highest intensity illumination to nearly zero illumination.

It has been found that fluorescent lamps that have been colored green are best suited for use in photographic equipment because they emit a practically constant temperature over the entire adjustable illumination range.

All of the aforedescribed photographic apparatuses have an important drawback in that they require time-consuming and skilled service personnel to operate them. Since these apparatuses must be carefully operated, mistakes are frequently made in photographing some sheets. The type of material that is photographed by microfilm cameras is, however, generally available only once and then only for short periods of time and is then generally stored away, so that it is frequently impossible or difficult and time-consuming to obtain the material a second time for microfilm photographing. Furthermore, it should be noted that a mistake in sequential microfilm photographing would only be discovered after the entire microfilm spool has been exposed and developed which may take a long time.

It is therefore a general object of this invention to provide a microfilm photographic apparatus which operates completely automatically.

It is another more specific object of this invention to provide a photographic microfilm apparatus which has a fixed shutter opening and a fixed shutter time exposure and in which the artificial illumination is automatically adjusted.

It is yet another specific object of this invention to provide a photographic microfilm apparatus which is provided with artificial illuminating means that are automatically adjusted within approximately $\frac{1}{50}$ of a second.

The arrangement of this invention obtains the aforelisted objects by illuminating directly and/or transilluminating the sheet to be photographed on microfilm by means of a plurality of green tinted fluorescent lamps. The light energy emanating from the illuminated sheet which is to be photographed impinges on a photoresistance, known per se, which via known switching means and a known phase shift circuit adjusts the light energy emitted by the tinted fluorescent lamps in inverse proportion to the amount of light energy reflected and partially directed into said photoresistance from the illuminated sheet that is to be photographed. The shutter of this arrangement has a fixed opening and a constant exposure time. The adjustment of the green tinted fluorescent lamps is such that substantially equal amounts of light energy, having substantially equal photochemical effects, enter the shutter opening, during each taking of a photographic picture, and impinge on the microfilm.

The aforedescribed arrangement of this invention is further provided with regulating means that are operatively connected to the phase shift circuit and by means of which the phase shift circuit can be adjusted in accordance with different film speeds of the microfilm.

The arrangement can further be provided with a potentiometer which is electrically connected to a phase shift circuit and which can be manually adjusted to regulate the light energy of the green tinted fluorescent lamps which directly illuminate. This manually adjustable potentiometer is used when only direct illumination is used in the apparatus.

When simultaneous direct illumination and transillumination is used, the sum of the emitted light energy impinges on a photoresistance. The electrical energy produced in the photoresistance is then conducted via a plurality of transistors simultaneously to the phase shift circuit in the energizing circuit of the green tinted fluorescent lamps which directly illuminate, as well as to the phase shift circuit in the energizing circuit of the green tinted fluorescent lamps which transilluminate.

Each group of fluorescent lamps is further provided with a potentiometer, known per se, which is connected in a master circuit and by means of which a separate adjustment of the illuminating intensity of each group of fluorescent lamps can be made.

The arrangement is further provided with a third potentiometer in an overall master circuit, which independently from the other two potentiometers regulates the total light energy emitted by both groups of green tinted fluorescent lamps in accordance with the film speed of the microfilm mounted in the microfilm camera.

The arrangement of this invention is further provided with a pair of planar-silicon transistors which are situated in the circuit of the photoresistance. The latter has an approximate range of 50 to 1500 ohms. The individual parts of the switching means can be mounted on a common board which can be easily dismounted. The switching means are electrically connected to the photoresistance.

The aforementioned as well as additional objects, features, and advantages of the present invention will become more clearly apparent from the following detailed description thereof which is to be read with reference to the accompanying drawings, in which:

FIG. 3 is a circuit diagram which illustrates the direct illumination circuit and transillumination circuit separately.

Figure 1:
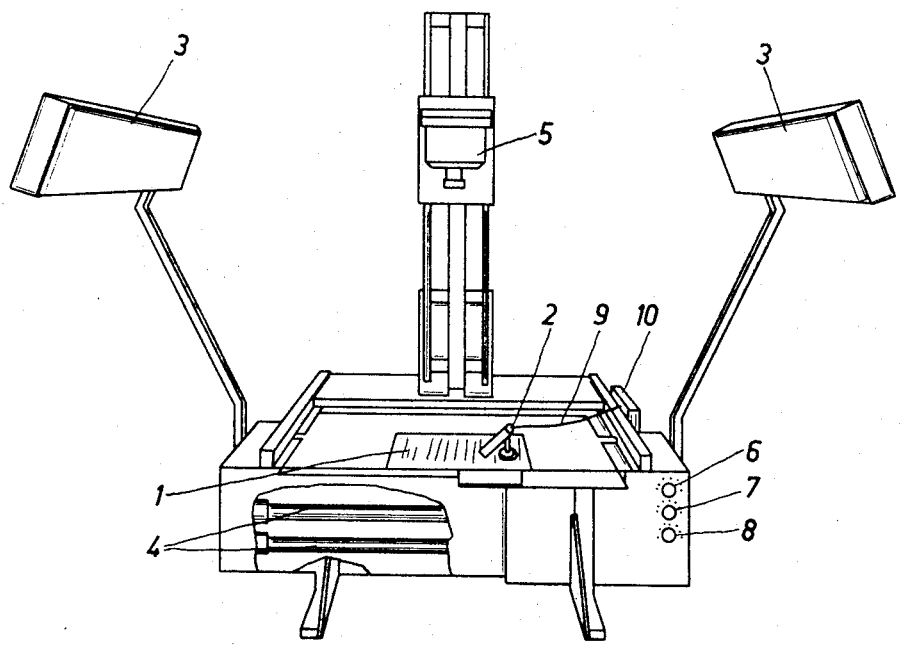
FIG. 1 is a simplified schematic view in perspective of the photographic apparatus of this invention.

Referring now specifically to the drawings, there is illustrated in FIG. 1 a sheet 1 which is to be photographically reproduced on microfilm. The sheet 1 lies on a frosted glass plate. A photo-electric cell 2 in the form of a photoresistance is movably mounted on the frosted plate. The sheet 1 can be directly illuminated from above by means of a pair of groups of fluorescent lamps 3. The sheet 1 can also be transilluminated from below by means of a group of fluorescent lamps 4. A known photographic camera device 5 is adjustably mounted over the frosted glass plate. Three adjusting knobs 6, 7 and 8 are rotatably mounted on the front wall of the camera table. Knob 6 is operatively connected to the potentiometer in the master circuit for the pair of groups of fluorescent lamps 3 which illuminate directly; knob 7 is operatively connected to the potentiometer in the master circuit for the group of fluorescent lamps 4 which transilluminate; and knob 8 is operatively connected to the potentiometer in the overall master circuit for combined adjustment of the direct illumination and transillumination. The photoresistance 2 is connected to a switchbox 10 by means of an electrical cable 9. The various switching elements for regulating the illumination of the fluorescent lamp groups 3 and 4 are mounted inside the switchbox 10.

Figure 2:
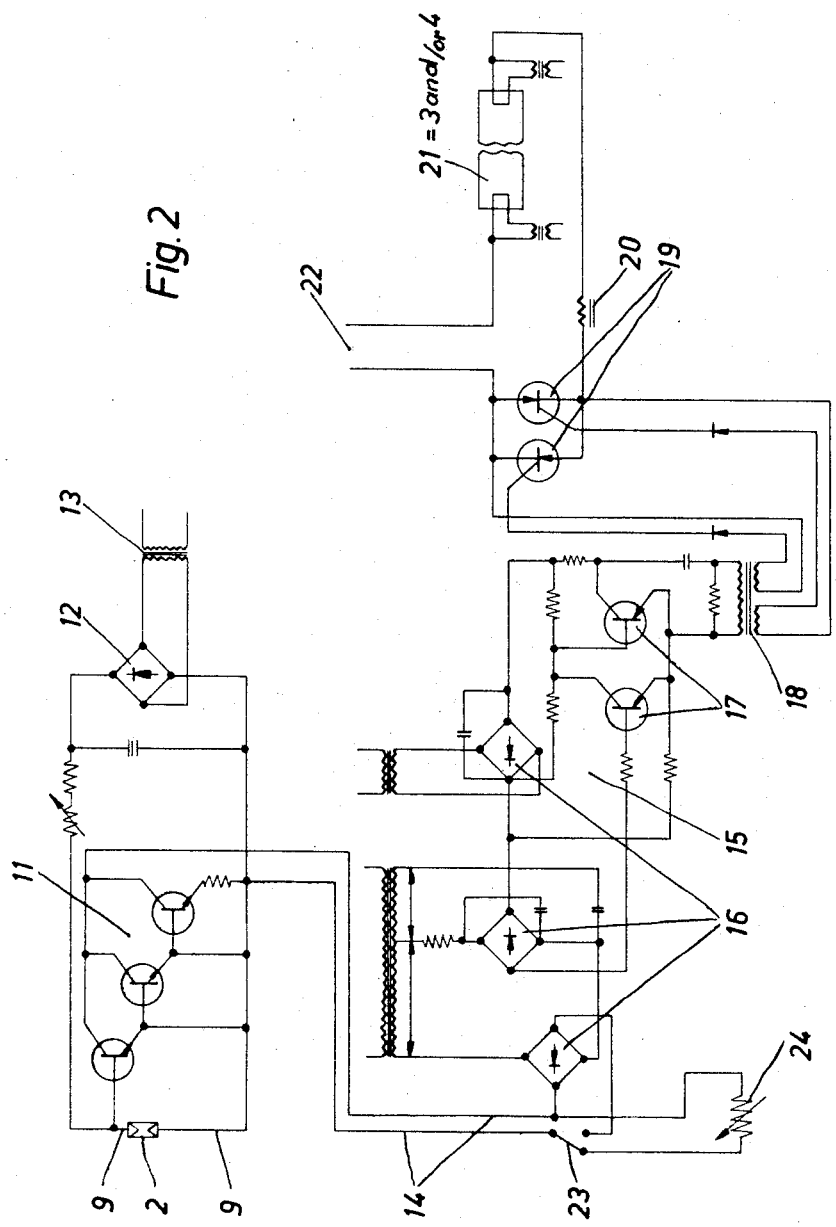
FIG. 2 is a combined circuit diagram of the trans and direct illumination circuits which illustrates the relationship of the various switching means forming part of this invention.

The circuit diagram of FIGURES 2 and 3 illustrates the following:

A photoresistance 2 and a transistor amplifier 11, are supplied by power from a rectifier 12, shown schematically as a bridge rectifier, which is connected to an electrical power source 13. Control energy amplified by transistor amplifier group 11 is applied by means of connections 14 to a phase control circuit, generally indicated at 15, and consisting of known components. The phase control circuit 15 comprises three rectifiers 16 which supply the transistor preamplifier 17 to control a transformer 18. Transformer 18 supplies triggering potential to the control electrodes of a pair of silicon controlled rectifiers 19, in circuit with fluorescent lamps 21 and a choke 20. The entire circuit is supplied by energy from an electrical source 22. In order to obtain manual control of the phase control and phase shift circuit 15, connections 14 can be interrupted by means of a switch 23, and the portion of the phase during which the controlled rectifiers 19 will be triggered, can be regulated by a potentiometer 24. Similarly in FIG. 3, connections 14 of the two circuits can be interrupted by means of a switch (not illustrated) and the portion of the phase during which the controlled rectifiers 19 will be triggered, can be regulated by a potentiometer 24 only illustrated in transillumination circuit of FIG. 3. Other circuits illustrating phase control of silicon controlled rectifiers are illustrated in textbooks, for example: "SCR Manual," General Electric Co., Auburn, N.Y.

The automatic light control for the microfilm copier operates as follows:

The document 1 is placed on the table, and depending on the quality of the material which is to be reproduced, it is decided if it should be photographed only with light from above, light through the document, or by both lights, jointly. If light from above is to be used, fluorescent lamps 3 are connected; if light from below, that is through the document, is to be used, fluorescent lamps 4 are connected. If both are to be used, lamp groups 3 and 4 are both connected. Then photoresistance 2 is brought into optical relationship with the document 1 and measures the light intensity emanating from document 1. This light intensity consists of reflected light only if lamps 3 are used alone; when lamps 4 are used singly, then light mainly coming through the document is only measured. The latter mentioned light is attenuated by the kind of material and the thickness of the document 1. When both lamps 3 and 4 are used, photoresistance 2, which is mounted obliquely downwardly towards the frosted glassplate, measures both the reflected as well as the transmitted light.

Control energy from photoresistance 2 influences, over conductors 14, the point at which phase control 15 will trigger the silicon controlled rectifiers 19, thus influencing the brightness of the fluorescent lamps 3 and 4, or both so that the control of the phase control circuit 15 is achieved directly by the optical reflection and light transmission characteristics of the document or sheet 1. Adjustment of the proper intensity of illumination, for example by utilizing only lamps 3, is done as follows: Let it be assumed that document or sheet 1 consists of a bright, white paper. In this case, light from lamps 3 impinging on the document 1 is strongly reflected and a large amount of light will be incident on photoresistance 2. This will control the phase control circuit 15 in such a manner that the illuminating intensity with which fluorescent lamps 3 are illuminated is decreased, such that the reflected light from document 1, which reaches the objective of camera 5 and then the photographic film, corresponds exactly to the amount of light required by the photographic film for a proper exposure.

In case the document should consist of green or pink paper, for example, then of course, less light is reflected than when a white document is used. Thus, photoresistance 2 consequently receives less reflected light, thus less control energy is applied to the phase control circuit 15, in such a manner that a longer portion of the cycle from supply 22 is applied to the fluorescent lamps 3 so that the lamps 3 will give a larger amount of light. The light emitted by the lamps 3 will be just of the right amount in order to provide for the same intensity of reflected illumination to photoresistance 2, as was the case previously. The required light energy for a particular sheet color, for example a white sheet, determines a single adjustment of the device by means of knob 6. This adjustment takes into consideration the possibility of variable factors such as, for example, the photographing of sheets with colors other than white or simultaneously illuminating and transilluminating the sheet. The shutter opening and the shutter exposure time remain, however, constant and are not adjusted in accordance with the aforedescribed variable factors.

In the event, only transillumination is used, the adjustment of the light intensity of lamps 4 is exactly the same as that of the adjustment for direct illumination only. The light incident on photoresistance 2 is then not reflected light but only direct light. This direct light is attenuated by the type of material of the sheet as well as its thickness and color, all of which determine the amount of light incident on photoresistance 2.

In the event, a combination of direct illumination and transillumination is used, the adjustment of the light intensity of both lamp groups 3 and 4 remains as described above. The photoresistance 2 measures the sum of light reflected by and transmitted through the sheet 1.

The group 3 of fluorescent lamps can be manually adjusted via a potentiometer 24 which is operatively connected to the knob 6. Similarly, the group of fluorescent lamps 4 can be manually adjusted by means of the knob 7 and both groups of fluorescent lamps can be adjusted by means of knob 8.

The aforedescribed arrangement of this invention for automatic self-adjustment of the artificial illumination in microfilm cameras offers the following advantages:

The artificial illumination adjusts itself so that always the correct amount of light impinges on the unexposed microfilm. Since the apparatus of this invention adjusts itself, the possibility of human error is completely eliminated, regardless whether direct illumination, transillumination, or both are used. Thus, the possibility of incorrect exposure of the microfilm has practically been eliminated, even if sheets of different color, texture, etc. are successively photographed.

The entire microfilm reel is uniformly exposed despite radically different material being inserted into the device for reproduction. This results in a further advantage in that the same bath solution and bath temperature can be used in developing the microfilm, which makes for a simple and easy developing process.

The exposure time and opening of the shutter mechanism are constant. Consequently, a very rudimentary shutter may be used in the camera of the apparatus of this invention.

Since a fixed objective lens setting may be used in the camera, a further advantage is provided in eliminating the necessity to adjust the lens before taking a picture in order to focus properly the object to be photographed. This again eliminates the possibility of human error.

The invention is not limited to the arrangement described above and illustrated in the drawings. What is essential is that a plurality of constructional elements, some of which are well known, cooperate to produce the desired result of automatically self-adjusting the light intensity of the artificial illuminating means of the microfilm camera. Green-tinted fluorescent lamps are advantageously used because they maintain their color temperature practically constant over the entire illumination intensity adjustment range. The illumination intensity of the fluorescent lamps is infinitely variably controlled by regulating the phase of the energizing current. The phase control circuit forms part of a control plate which comprises transistors and rectifiers of semi-conductor material. The self-adjusting of the artificial illumination in accordance with the type of material to be reproduced photographically is accomplished by automatically adjusting the light intensity of the fluorescent lamps by means of the phase control circuit. Two planar silicon transistors are connected to the photoresistance 2 and are made to conduct current in accordance with the amount of light energy impinging on the photoresistance 2, the electrical resistance of which varies from 50 to 1500 ohms, depending on the amount of impinging light energy. The current emanating from the pair of planar silicon transistors determines the phase-amplitude of the energizing current for the fluorescent lamps. The various electronic components illustrated in FIG. 2 and described above may, of course, be replaced by other equivalent electrical components.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A photographic apparatus, comprising in combination, a table, lighting means mounted over said table, camera means mounted over said table and adapted to take photographs of material placed on said table, photoelectric cell means movably mounted on said table and adapted to measure light emanating from or being reflected by said material on said table, an electric power source electrically connected to said lighting means by an electric circuit, said photoelectric cell means forming part of said electric circuit, said circuit further comprising a phase control circuit between said electric power source and said photoelectric cell means; whereby the electric current from said photoelectric cell means regulates via said phase control circuit the energizing electric power supply by said electric power source to said lighting means and thereby regulates the light intensity thereof.

2. A photographic apparatus of the character described, comprising in combination, a transparent camera table, first fluorescent lamp means operatively mounted over said transparent camera table for illuminating the same, camera means mounted over said transparent camera table and adapted to take photographs of material placed on said transparent camera table, second fluorescent lamp means operatively mounted under said transparent camera table for transilluminating the same, photoelectric cell means movably mounted on said transparent camera table and adapted to measure light emanating from or being reflected by said material placed thereon, an electric power source electrically connected to said first and second fluorescent lamp means by means of an electric circuit, said photoelectric cell means being electrically connected to said electric circuit, said circuit comprising at least one phase control circuit between said electric power source and said photoelectric cell means; whereby the electric current from said photoelectric cell means regulates via said phase control circuit the energizing electric power supply by said electric power source to said first and second fluorescent lamp means and thereby regulates the light intensity thereof prior to the taking of photographs by said camera means.

3. A photographic microfilm apparatus, comprising in combination, a transparent camera table, first fluorescent lamp means operatively mounted over said transparent camera table for illuminating the same, camera means operatively mounted over said transparent camera table and adapted to take photographs of material placed on said transparent camera table, said camera means having a shutter with a fixed opening and fixed exposure time, second fluorescent lamp means operatively mounted under said transparent camera table for transilluminating the same, photoelectric cell means movably mounted on said transport camera table and adapted to measure light emanating from or being reflected by said material placed thereon, an electric power source electrically connected to said first and second fluorescent lamp means by means of an electric circuit, said photoelectric cell means being electrically connected to said electric circuit, potentiometer means electrically connected to said electric circuit between said photoelectric cell means and said electric circuit, a switch connected to said potentiometer means for selectively connecting said potentiometer means to said electric circuit and simultaneously therewith disconnecting said photoelectric cell means from said electric circuit, said electric circuit comprising phase control circuit means between said electric power source and said photoelectric cell means; whereby the electric current from said photoelectric cell means, when the latter are connected to said electric circuit, or said potentiometer means when the latter are connected to said electric circuit, regulates via said phase control circuit means the energizing electric power supply by said electric power source to said first and second fluorescent lamp means and thereby regulates the light intensity thereof prior to the taking of photographs by said camera means.

4. The photographic apparatus as set forth in claim 2, wherein said first and second fluorescent lamp means comprise a plurality of green colored fluorescent lamps.

5. The photographic microfilm apparatus as set forth in claim 3, wherein said first and second fluorescent lamp means comprise a plurality of green colored fluorescent lamps.

6. The photographic microfilm apparatus as set forth in claim 3, wherein said potentiometer means comprise a first potentiometer in said electric circuit which is electrically connected to said first fluorescent lamp means via a first phase shift circuit of said phase shift circuit means, and a second potentiometer in said electric circuit which is electrically connected to said second fluorescent lamp means via a second phase shift circuit of said phase shift circuit means, first and second knobs respectively rotatably mounted on said transparent camera table and respectively operatively connected to said first and second potentiometers, said first and second knobs being adapted to respectively regulate the energizing power supply by said electric power source to said first and second fluorescent lamp means and thereby regulate the light intensity thereof prior to the taking of photographs by said camera means.

7. The photographic microfilm apparatus as set forth in claim 6, wherein said potentiometer means comprise a third potentiometer (24) in said electric circuit, and a third knob (8) rotatably mounted on said transparent camera table and operatively connected to said third potentiometer (24), said third knob (8) being adapted when manually adjusted and when said switch (23) connects said third potentiometer (24) to said electric circuit to jointly regulate the energizing power supply by said electric power source (22) to said first and second fluorescent lamp means (3, 4, 21) and thereby regulate the light intensity thereof prior to the taking of photographs by said camera means.

8. The photographic microfilm apparatus as set forth in claim 3, wherein said potentiometer means (24) comprise a first potentiometer (24) in said electric circuit which is electrically connected to said first fluorescent lamp means (3, 21) via a first phase shift circuit (15) of said phase shift circuit means (15), and a second potentiometer (24) in said electric circuit (15) which is electrically connected to said second fluorescent lamp means (4, 21) via a second phase shift circuit (15) of said phase shift circuit means (15); first (6) and second knobs (7) respectively rotatably mounted on said transparent camera table and respectively operatively connected to said first and second potentiometers (24), said first and second knobs (6, 7) when manually adjusted being adapted to respectively regulate the energizing power supply by said electric power source (22) to said first and second fluorescent lamp means (3, 4, 21) and thereby regulate the light intensity thereof prior to the taking of photographs by said camera means (5).

9. The photographic microfilm apparatus as set forth in claim 3, wherein said electric circuit comprises two planar silicon transistors, and wherein the electric resistance of said photoelectric cell means varies in a range of about between 50 ohms to 1500 ohms.

10. The photographic microfilm apparatus as set forth in claim 3, wherein said electric circuit is mounted on a plate, said plate being removably mounted in said transparent camera table and electrically connected to said photoelectric cell means.

References Cited

UNITED STATES PATENTS

| | | | |
|---|---|---|---|
| 3,056,332 | 10/1962 | Beregowitz | 95—10 X |
| 3,119,301 | 1/1964 | Beattie et al. | 88—2 X |

NORTON ANSHER, *Primary Examiner.*

R. A. WINTERCORN, *Assistant Examiner.*